INVENTORS.
WILLIAM R. MOORE
JACOB T. ZEIGLER

INVENTORS.
WILLIAM R. MOORE
JACOB T. ZEIGLER

BY [signature]
ATTORNEY.

United States Patent Office 3,378,767
Patented Apr. 16, 1968

3,378,767
MARKING INCREMENTAL LENGTHS OF INSULATED FOIL STRIP ELECTRODES IN EQUAL CAPACITANCES IN RESPONSE TO INTEGRATED SPEED AND CAPACITANCE SIGNALS
William R. Moore, Columbia, and Jacob T. Zeigler, Cayce, S.C., assignors to General Electric Company, a corporation of New York
Filed Oct. 5, 1964, Ser. No. 401,401
10 Claims. (Cl. 324—71)

ABSTRACT OF THE DISCLOSURE

An insulated foil electrode is measured in length of equal capacitance values by correlating a continuous capacitance measurement of the electrode with a measured rate of its passage through an electrolytic bath.

---

This invention relates to improvements in the manufacture of capacitors. More specifically, it relates to a method and apparatus for measuring and marking insulated foil used to fabricate capacitor elements.

One of the most common types of electrolytic capacitor utilizes strips of insulated foil as electrodes. The capacitance of such an electrolytic capacitor is to a certain extent directly proportional to the length of the foil strip. In the past in order to construct capacitors of a desired capacitance the foil was cut into predetermined standard segments whose lengths were determined by various methods. One method was to first construct one capacitor with foil taken from a large spool, and then from this capacitor determine a standard length of the foil segments for use in all capacitors of the same capacitance formed from foil of that particular spool. In a second method used with an insulated foil, such as aluminum foil having an insulating oxide film, small samples of foil were taken from the beginning and the end of the foil, and capacitance measurement would be used to determine the standard length of foil for the entire supply roll. Using the lowest capacitance sample, would insure that none of the capacitors formed from the supply roll would be under the desired capacitance.

Samples taken in accordance with the above methods consist of only a few feet from one and/or both ends of a roll which might include 2,500 linear feet of foil. Consequently, neither of these methods has proved to be truly satisfactory, in that the sampling is inadequate to truly represent the capacitance of capacitors formed from the segment of foil from an entire supply spool. Nevertheless, it has been found to be uneconomical to take a larger number of samples. The cost of taking a larger number of samples was found to outweigh the disadvantage in using a larger amount of foil than necessary in the majority of the capacitors.

It is an object of this invention to provide a method for determining a length of foil which will give a predetermined capacitance when formed as an electrolytic capacitor.

It is a further object of this invention to provide a method for continuously measuring the capacitance of an insulated foil as the foil moves during the manufacturing process and for marking segments of the foil which will produce an electrolytic capacitor of a predetermined capacitance.

It is another object of this invention to provide a means for automatically tabbing a strip of insulated foil at intervals wherein the portion of the foil between adjacent tabs has a predetermined capacitance.

These objects are accomplished in accordance with this invention, in one form thereof by passing a strip of insulated foil having a linear velocity through a quantity of low resistivity electrolyte. An electrode is immersed in the electrolyte, and the capacitance between the electrode and the foil due to the insulation on the foil is measured. A signal proportional to the capacitance and another signal proportional to the velocity are integrated to provide a signal which actuates a means for marking the foil at intervals such that the segments of foil between adjacent marks are of a desired capacitance.

Other objects and further details of that which is believed to be novel in the invention will be clear from the following description and claims taken with the accompanying drawings wherein:

Figure 1:
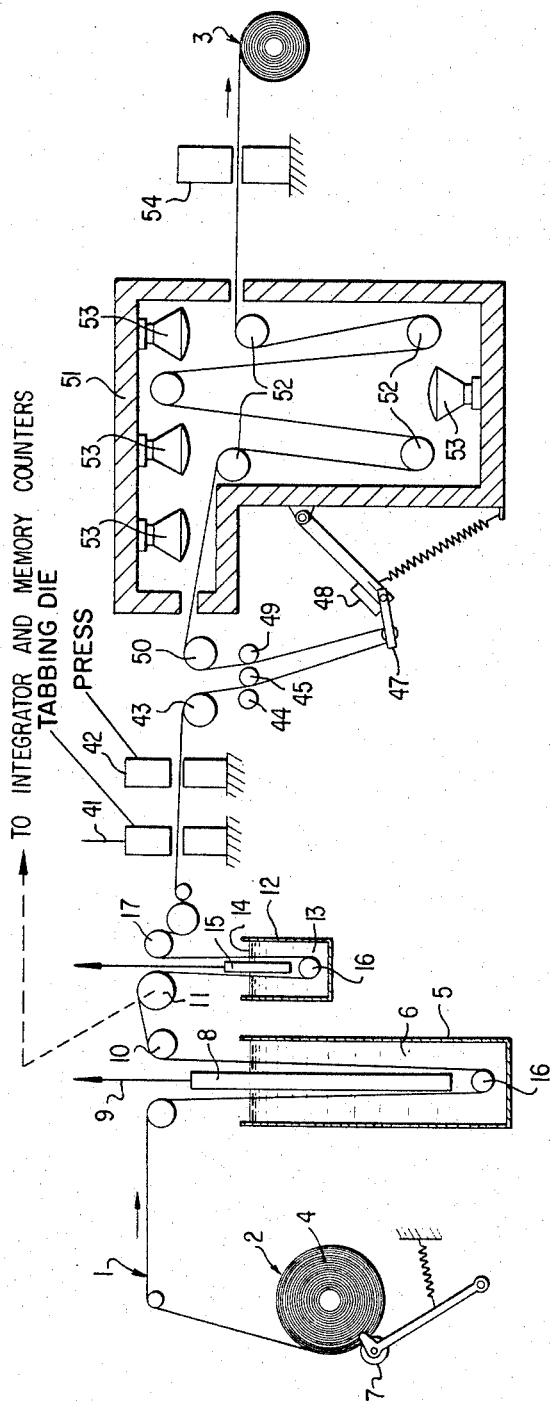
FIGURE 1 is a schematic diagram of a system for processing insulated foil including an oxide film formation tank, an apparatus for measuring and marking insulated foil, and a dryer.

By reference to FIGURE 1 of the drawings, it will be seen that a strip of foil 1 is drawn through the measuring and marking system from a supply roll 2 to a take-up roll 3. The system shown is designed for use with aluminum foil having an oxide film. Because of its high leakage current characteristic, the initially formed oxide film is unsatisfactory for the method employed by the system of this invention, and therefore the oxide film is reformed just prior to use of the foil. The supply roll 2 of aluminum foil has just been cut from a roll of reformed foil having a greater width, so that the foil edge indicated by reference numeral 4 is freshly cut. Good electrical contact can be made with this freshly cut edge.

To reform the oxide film on the freshly cut edges, a formation tank 5 is filled with a hot electrolyte 6. The foil 1 is drawn over guide rollers, and a roller 7 makes electrical contact with the foil edge 4. A positive voltage is supplied to the roller 7, while a negative voltage is applied to a cathode 8, which is immersed in the hot electrolytic 6, via a conductor 9. The foil with the reformed oxide film is then advanced over rollers 10 and 11 to a measuring tank 12.

The measuring tank contains a low resistivity electrolyte 13, which is maintained at a predetermined level 14. A stainless steel cathode 15 is partially wrapped by insulation and immersed in the electrolyte 13. The insulation does not completely cover the cathode 15, but does prevent the foil 1 from contacting it. The foil is guided from roller 11 around a roller 16, which is mounted within the measuring tank 12 and submerged within the electrolyte 13, and out of the measuring tank around a roller 17. The foil is maintained under tension, such that a predetermined length of foil is maintained in the electrolyte 13 at all times. At this stage the foil is entirely insulated from the electrolyte 13, by the oxide film on the foil.

Figure 2:
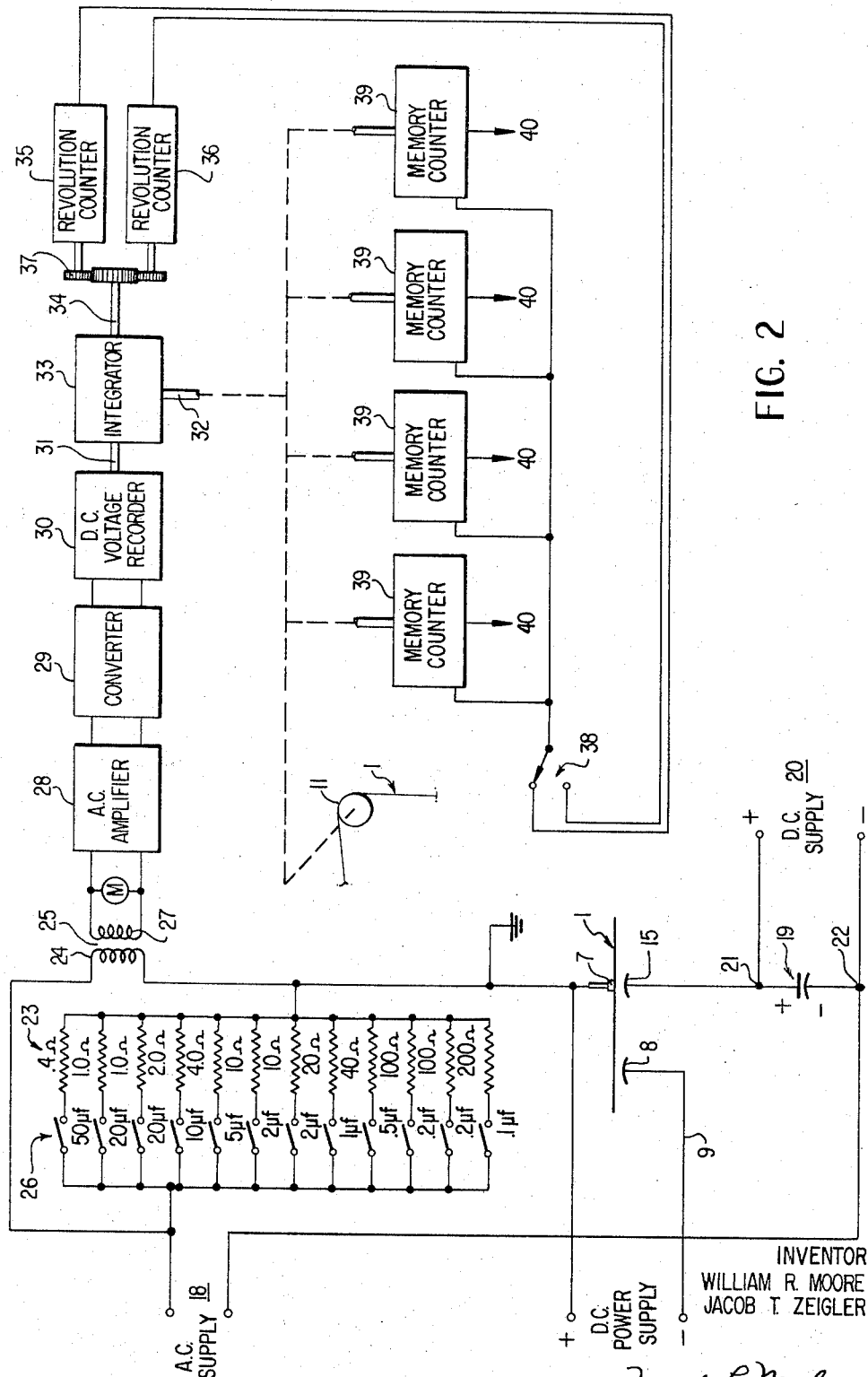
FIGURE 2 is a schematic diagram of the electrical and mechanical control system for the foil measuring and marking system shown in FIGURE 1.

Referring to FIGURE 2, the means by which capacitance of the foil is measured may be seen. This means includes the roller 7 schematically shown in contact with the aluminum foil 1. Similarly, the cathode 8 which is immersed in the formation tank 5 is schematically shown adjacent to the foil. A direct current formation power supply is connected between the roller 7 and the cathode 8 with the positive terminal of the supply connected to the roller. Similarly, the cathode 15 which is immersed in the measuring tank is schematically shown spaced from the aluminum foil 1. An AC voltage from AC supply 18 is applied to the roller 7 and to cathode 15 which with the insulated foil 1 therebetween forms a capacitor. In series with the capacitor formed between the roller 7 and the cathode 15 by the oxide film separating the electrolyte and the foil, is a capacitor 19 which has a large capacitance so as to present a low impedance to AC current flowing through it. A DC bias as applied to the capacitor 19 by a DC supply 20. The positive terminal of the supply 20 is connected to terminal 21 of capacitor 19 and the negative terminal is connected to terminal 22 of capacitor 19. The DC bias is used to insure conduction between cathode 15 and the foil 1 through the low resistivity electrolyte 13. This bias is applied across the capacitor 19, so that the bias supply does not introduce an addition impedance to the AC current flowing between the cathode 15 and the foil 1.

Also in series between the AC supply terminal and the roller 7 is a group of decade resistors 23. Switches 26 are provided to selectively insert the decade resistors 23 into the circuit. The resistors are used to develop a voltage across a primary winding 24 of an isolation transformer 25. This voltage is proportional to the current flowing through the series circuit which includes the decade resistors 23, roller 7, cathode 15 and capacitor 19. Since the resistivity of the electrolyte 13 is very low, the capacitance between cathode 15 and roller 7 is almost entirely due to the oxide film on the foil. In the series circuit just described, the current is equal to the AC supply voltage divided by the series circuit impedance. This impedance is equal to: $Z=\sqrt{X_c^2+R^2}$.

The resistance of the circuit which is primarily that of the decade resistors 23, is kept below one tenth of the capacitive reactance $X_c$, and therefore can be neglected with less than one-half of one-percent error. Therefore, Z is equal to $X_c$ which is equal to $$\frac{1}{2\pi fc}$$

This value of $X_c$ results in the current being equal to $V2\pi fc$ where $f$ is the frequency of the AC supply 18, and is the constant 3.14. The AC supply voltage and its frequency are maintained constant, so that the current is directly proportional to the capacitance of the series circuit. The current flowing through any of the decade resistors switched into the series circuit thereby develops a voltage drop thereacross which is proportional to the current, which in turn is proportional to the capacitance.

Typical resistance values for the decade resistors are shown in FIGURE 2. The switches 26 which are in series with the decade resistors are labeled in terms of farads of capacitance. When the capacitance between the roller 7 and the cathode 15 is equal to the capacitance indicated by the sum of the farad values indicated on the closed switches 26, the AC voltage developed across the resistors is such that a calibrated percentage deviation scale on the recorder reads zero.

The AC voltage appearing across a secondary winding 27 of transformer 35 is applied to the input terminals of an AC amplifier 28. The output of the AC amplifier 28 is applied to a converter 29 which in turn energizes a DC voltage recorder 30. A rotating output shaft 31 of the voltage recorder 30 and a shaft 32 which is driven by the rotation of roller 11 which turns with movement of the foil 1, are the mechanical inputs to integrator 33 which may be of the ball and disk type. The output of the integrator is essentially the product of a signal proportional to the value of the capacitance of the foil times a signal proportional to the speed of the foil 1 and it appears as rotation of a shaft 34. Shaft 34 drives two revolution counters 35 and 36 through a gear train 37.

Electrical signals from one or the other of these revolution counters 35 and 36 are alternately connected by switch 38 to several memory counters 39 which are also driven by roller 11. At intervals proportional to a predetermined capacitance of the foil, the output 40 of one of the memory counters will actuate a marking or tabbing die 41, shown in FIGURE 1. The outputs 40 of the memory counters may be electrical signals which actuate a relay, which in turn causes operation of the die 41.

Since the time needed to measure a segment of foil having a predetermined capacitance may be less than the reset time of the revolution counters 35 and 36, two such counters may be necessary to allow one to reset while the other is counting. Similarly, several memory counters may be necessary where several tabs are to be applied within a length of foil corresponding to that which extends between the entrance of the foil into the measuring tank 12 and the marking or tabbing die 41.

If tabs are applied to the foil by the die 41, a press 42 is provided for securing the tabs to the foil. After passing through press 42, the foil is directed over roller 43 between rollers 44 and 45 to the roller 47 of a tensioning device 48. Tensioning device 48 maintains the foil under a predetermined tension, thereby insuring accurate measurement of the capacitance and marking or tabbing of the foil. The foil after passing over tensioning rollers 47 passes between rollers 45 and 49, and is then directed around roller 50 and into a foil dryer 51.

The foil is directed through the dryer 51 by a plurality of rollers 52. These rollers are positioned so as to expose both sides of the foil 1 to a plurality of heating elements 53. After the foil has been dried in the dryer 51 it is passed through a die 54 to the take-up roll 3. A die 54 may be used to perforate the foil adjacent each of the marks or tabs, or for actually cutting the foil adjacent each mark or tab. The marked or tabbed foil which is rewound on take-up roll is accurately divided into portions having a predetermined capacitance, and is ready for further processing and formation into an electrolytic capacitor having a predetermined capacitance.

While a particular embodiment of a system for affecting the method of this invention for marking or tabbing foil has been shown, other systems for marking or tabbing the foil in accordance with the method of this invention will be apparent to those skilled in the art, and it is intended to cover by the appended claims all systems and methods falling within the scope thereof.

What we claim as new and desire to secure by Letters Patent of the United States is:

1. A method for marking at measured intervals an elongated strip of insulated foil, said method consisting of:
    (a) continuously passing said elongated strip of foil through a low resistivity electrolyte;
    (b) measuring the capacitance between said foil and said electrolyte, and producing a first output proportional to said capacitance;
    (c) measuring the rate at which said foil is passing through said electrolyte, and producing a second output proportional to said rate;
    (d) combining said first and second outputs so as to provide a third output which is proportional to the product of said first and second outputs;
    (e) utilizing said third output to actuate a means for marking said foil at measured intervals such that said foil between a pair of marks has a predetermined capacitance.

2. A method for marking at measured intervals an elongated strip of foil insulated by an oxide film, said method consisting of:
    (a) continuously passing said elongated strip of foil through a hot electrolyte;
    (b) establishing a potential difference between said foil and said hot electrolyte so as to reform an oxide film on said foil;
    (c) continuously passing said elongated strip of foil through a low resistivity electrolyte;
    (d) measuring the capacitance between said foil and said electrolyte, and producing a first output proportional to said capacitance;
    (e) measuring the rate at which said foil is passing through said electrolyte, and producing a second output proportional to said rate;
    (f) combining said first and second outputs so as to provide a third output which is proportional to the product of said first and second outputs;

(g) utilizing said third output to actuate a means for marking said foil at measured intervals such that said foil between a pair of marks has a predetermined capacitance.

3. A method for marking at measured intervals an elongated strip of aluminum oxide coated aluminum foil for capacitor electrode use, said method consisting of:

(a) continuously passing said elonagted strip of foil through a low resistivity electrolyte while maintaining a predetermined length of foil in said electrolyte;

(b) applying an AC voltage between said electrolyte and said foil;

(c) measuring the AC current flowing between said electrolyte and said foil so as to determine the capacitance between said foil and said electrolyte, and producing a first electrical signal output proportional to said capacitance;

(d) measuring the rate at which said foil is passing through said electrolyte, and producing a second electrical signal output proportional to said rate;

(e) combining said first and second outputs so as to provide a third electrical signal output which is proportional to the product of said first and second outputs;

(f) utilizing said third electrical signal output to actuate a means for marking said foil at measured intervals such that said foil between a pair of marks has a predetermined capacitance.

4. An apparatus for marking at measured intervals an elongated strip of insulated foil, said apparatus comprising:

(a) a quantity of low resistivity electrolyte;
(b) an electrode immersed in said electrolyte;
(c) a means for continuously drawing said foil through said electrolyte;
(d) a means electrically connected to said foil and to said electrode to measure the capacitance between said foil and said electrolyte, and to produce a first output proportional to said capacitance;
(e) a means for measuring the rate at which said foil is drawn through said electrolyte, and to produce a second output proportional to said rate;
(f) a means responsive to said first and second outputs to provide a third output which is proportional to the product of said first and second outputs; and
(g) a means responsive to said third output to mark said foil at measured intervals such that said foil between a pair of marks has a predetermined capacitance.

5. The apparatus of claim 4 wherein a means responsive to said third output marks said foil by securing a tab thereto.

6. An apparatus for marking at measured intervals an elongated strip of insulated foil, said apparatus comprising:

(a) a measuring tank;
(b) a quantity of low resistivity electrolyte maintained at a predetermined level in said measuring tank;
(c) an electrode immersed in said electrolyte;
(d) a means for continuously drawing said foil through said electrolyte and for maintaining a predetermined length of said foil in said electrolyte;
(e) a means electrically connected to said foil and to said electrode to measure the capacitance between said foil and said electrolyte, and to produce a first output proportional to said capacitance;
(f) a means for measuring the rate at which said foil is drawn through said electrolyte, and to produce a second output proportional to said rate;
(g) a means responsive to said first and second outputs to provide a third output which is proportional to the product of said first and second outputs; and
(h) a means responsive to said third output to mark said foil at measured intervals such that said foil between a pair of marks has a predetermined capacitance.

7. An apparatus for marking at measured intervals an elongated strip of insulated foil, said apparatus comprising:

(a) a quantity of low resistivity electrolyte;
(b) an electrode immersed in said electrolyte;
(c) a means for continuously drawing said foil through said electrolyte;
(d) a means for applying an AC voltage between said foil and said electrode;
(e) a means for measuring the AC current flowing between said foil and said electrode, said means producing a first output which is proportional to the capacitance between said foil and said electrolyte;
(f) a means for measuring the rate at which said foil is drawn through said electrolyte, and to produce a second output proportional to said rate;
(g) a means responsive to said first and second outputs to provide a third output which is proportional to the product of said first and second outputs; and
(h) a means responsive to said third output to mark said foil at measured intervals such that said foil between a pair of marks has a predetermined capacitance.

8. An apparatus for marking at measured intervals an elongated strip of insulated foil, said apparatus comprising:

(a) a quantity of low resistivity electrolyte;
(b) an electrode immersed in said electrolyte;
(c) a means for continuously drawing said foil through said electrolyte;
(d) a means for applying an AC voltage between said foil and said electrode;
(e) a variable resistance in series with said foil and said electrode;
(f) a means for measuring the AC voltage developed across said resisitance, said means producing a first output which is proportional to the capacitance between said foil and said electrolyte;
(g) a means for measuring the rate at which said foil is drawn through said electrolyte, and to produce a second output proportional to said rate;
(h) a means responsive to said first and second outputs to provide a third output which is proportional to the product of said first and second outputs; and
(i) a means responsive to said third output to mark said foil at measured intervals such that said foil between a pair of marks has a predetermined capacitance.

9. An apparatus for marking at measured intervals an elongated strip of foil insulated by an oxide film, said apparatus comprising:

(a) a quantity of hot electrolyte;
(b) means for establishing a potential difference between said foil and said hot electrolyte so as to reform the oxide film on said foil;
(c) a quantity of low resistivity electrolyte;
(d) an electrode immersed in said electrolyte;
(e) a means for continuously drawing said foil through said electrolyte;
(f) a means electrically connected to said foil and to said electrode to measure the capacitance between said foil and said electrolyte, and to produce a first output proportional to said capacitance;
(g) a means for measuring the rate at which said foil is drawn through said electrolyte, and to produce a second output proportional to said rate;
(h) a means responsive to said first and second outputs to provide a third output which is proportional to the product of said first and second outputs;
(i) a means responsive to said third output to mark said foil at measured intervals such that said foil between a pair of marks has a predetermined capacitance.

10. An apparatus for marking at measured intervals an elongated strip of aluminum oxide coated aluminum foil for capacitor electrode use, said apparatus comprising:
(a) a quantity of low resistivity electrolyte;
(b) an electrode immersed in said electrolyte;
(c) a means for continuously drawing said foil through said electrolyte;
(d) a means electrically connected to said foil and to said electrode to measure the capacitance between said foil and said electrolyte, and to produce a first electrical signal output proportional to said capacitance;
(e) a means for measuring the rate at which said foil is drawn through said electrolyte, and to produce a second electrical signal output proportional to said rate;
(f) an integrator responsive to said first and second outputs to provide a third electrical signal output which is proportional to the product of said first and second outputs;
(g) counter means responsive to said second output and said third output to provide a fourth electrical signal output; and
(h) a means responsive to said fourth output to mark said foil at measured intervals such that said foil between a pair of marks has a predetermined capacitance.

References Cited

UNITED STATES PATENTS 2,137,133   11/1938   Dallmann _____ 324—71 XR

RUDOLPH V. ROLINEC, *Primary Examiner.*

E. E. KUBASIEWICZ, *Assistant Examiner.*